United States Patent [19]

Coleman

[11] Patent Number: 4,694,652
[45] Date of Patent: Sep. 22, 1987

[54] MASTER CYLINDER WITH RESERVOIR MOUNTING ARRANGEMENT

[75] Inventor: John R. Coleman, Dayton, Ohio

[73] Assignee: General Motors Corporation, Detroit, Mich.

[21] Appl. No.: 852,826

[22] Filed: Apr. 16, 1986

[51] Int. Cl.$^4$ .......................... B60T 11/26; F15B 7/08; F15B 7/10

[52] U.S. Cl. ......................................... 60/585; 60/592; 285/137.1; 285/332.4; 285/347

[58] Field of Search .......................... 60/562, 585, 592; 285/326, 332.4, 347, 137.1

[56] References Cited

U.S. PATENT DOCUMENTS

| | | | |
|---|---|---|---|
| 1,774,631 | 9/1930 | Boosey | 285/332.4 X |
| 3,357,724 | 12/1967 | Rassieur | 285/347 X |
| 4,004,425 | 1/1977 | Pickering | 60/562 |
| 4,474,005 | 10/1984 | Steer | 60/562 |
| 4,483,145 | 11/1984 | Takeuchi et al. | 60/562 X |

FOREIGN PATENT DOCUMENTS 58-160606 9/1983 Japan .................................... 60/562

Primary Examiner—Robert E. Garrett
Assistant Examiner—George Kapsalas
Attorney, Agent, or Firm—D. D. McGraw

[57] ABSTRACT

In order to accommodate all of the tolerances along the bore centerline plane of the reservoir mount for a master cylinder, the reservoir bayonets or projections extending into the boss bores of the master cylinder body are at a reduced diameter established by worst case tolerancing. This results in greater side-to-side clearance perpendicular to the bore center-line than is desired in many instances, giving a relatively loose reservoir fit. To reduce this side-to-side clearance, locally raised ribs or the like are added to the reservoir mount bayonets to better match the diameter in the machined body reservoir bosses provided by the boss reservoir mounting surfaces. The clearance is reduced by locally increasing the diameter of the reservoir bayonet mounts based on worst case tolerancing considering only one reservoir mounting member and its associated mounting boss independently of the other mounting member and its associated mounting boss.

7 Claims, 3 Drawing Figures

MASTER CYLINDER WITH RESERVOIR MOUNTING ARRANGEMENT

BACKGROUND OF THE INVENTION

1. Field of the Invention

The invention relates to the mounting of a reservoir on a master cylinder body, and more particularly to such a mounting when the master cylinder assembly formed by the reservoir and a cylinder body is of the dual master cylinder type.

2. Description of the Prior Art

It has been common practice to manufacture master cylinders with a plurality of pressurizing pistons acting on brake fluid in a plurality of pressurizing chambers which are located in axial alignment in a bore in a cylinder body, or in axially parallel bores in a cylinder body. Examples are shown in U.S. Pat. Nos. 2,157,733 entitled "Brake", issued May 9, 1939; 2,732,918 entitled "Brake Master Cylinder Assembly", issued Jan. 31, 1956; 3.021,678 entitled "Master Cylinder for Fluid Brake System", issued Feb. 20, 1962; 3,157,034 entitled "Dual Master Cylinder", issued Nov. 17, 1964; and 3,291,263 entitled "Servo Actuated Disc Brakes", issued Dec. 13, 1966, as well as the other patents noted below. In order to provide a separate reservoir body for brake fluid, reservoirs have been attached to the cylinder body in more recent years by means of a projection and a boss or mounting bore for each bore or bore section having a pressurized chamber. Examples of such arrangements are shown in U.S. Pat. Nos. 4,004,707 entitled "Fluid Baffle in Master Cylinder Reservoir", issued Jan. 25, 1977; 4,132,073 entitled "Master Cylinder Assembly" issued Jan. 2, 1979; 4,133,178 entitled "Quick Take-Up Master Cylinder", issued Apr. 18, 1979; 4,133,287 entitled "Reservoir With Integrally Formed Window and Method of Making Same", issued Jan. 9, 1979; 4,208,881 entitled "Quick Take-Up Master Cylinder", issued June 24, 1980; and 4,213,535 entitled "Fluid Reservoirs for Master Cylinders", issued July 22, 1980. In general, these arrangements have two or more openings which are spaced apart in the bottom of the reservoir body, which may or may not be connected to a spigot or bayonet formed or secured to the bottom of the reservoir body, which fit over or extend into bores formed in similarly spaced apart bosses which are a part of a cylinder body. Openings through the bayonets and the cylinder body bosses permit brake fluid to flow between the bore or bores of the master cylinder body and the reservoir in a manner well known in the art.

In order to assure that the master cylinder reservoir will always be assembled properly into or on the master cylinder body, the diameters of the openings formed in the bottom of the reservoir, as exemplified by U.S. Pat. No. 4,004,707 noted above, or of the bayonets and their seals, as exemplified by the other patents thereafter noted above, must be so sized as to accommodate all of the tolerances along the centerline joining the two bores in the cylinder body bosses as well as the tolerances in the associated portions of the reservoir body itself. Therefore, the basic diameters of the bayonets must be sufficiently small in relation to the bosses or opening with which they mate to accommodate what is commonly known as worst case tolerancing, or openings fitting over bosses must be sufficiently larger. Because of these differences in diameters, there is often excessive clearance which allows the reservoir body to fit somewhat loosely on the cylinder body, particularly insofar as the side-to-side relationship is concerned.

It is therefore desirable to minimize the excessive side-to-side clearance by better matching the diameter of the bayonet, for example, in the master cylinder mounting bore with which each bayonet is associated, rather than having to allow for worst case tolerancing involving both of the reservoir mounting bores and both of the mounting bayonet members, or even more such bores and bayonet members if three or more such combinations are provided. Such considerations include not only the individual diameters of each such arrangement but also the axial spacing between such plurality of arrangements. Since the worst case tolerancing must be considered in the plane joining the axes of the bosses and bayonet members, the diameters cannot be increased in this plane as would otherwise be desired.

SUMMARY OF THE INVENTION

It is therefore a feature of the invention that the basic radius or diameter of each of the bayonet members is locally increased from side-to-side in a plane which intersects the plane passing through the plurality of cylinder body bosses and bores. It is preferable that such localized increase occur in a plane which is perpendicular to the plane joining the axes of the cylinder body bores. In practicing the invention the increased diameter of the bayonet member is established by worst case tolerancing in the second noted plane by involving only the individual reservoir mounting bore in the cylinder body and individual reservoir mounting bayonet member which extends into that bore. This arrangement will provide additional stability for the reservoir body from side-to-side while continuing to assure the capability of the assembling the reservoir onto the master cylinder body.

While the preferred embodiment is disclosed in a master cylinder assembly having spaced apart bosses with mounting bores formed therein in axially parallel relation, it is to be understood that the invention may also be applied to arrangements of the type shown in U.S. Pat. No. 4,004,707, noted above, in which the reservoir bottom has flanged openings which extend over machined master cylinder body bosses. In either type of arrangement, the same considerations are to be given. It is also contemplated that the invention may be applied to parallel bore master cylinders in which the reservoir is mounted across the plural portions of the master cylinder body containing those bores, as shown in some of the above noted patents, instead of the tandem type dual type master cylinder disclosed in others of the above noted patents. However, the preferred embodiment is illustrated in the commonly employed tandem type dual master cylinder arrangement.

In the preferred embodiment illustrated, the reservoir mounting bayonet members are each formed with radius- or diameter-increasing rib-like protuberances which extend axially parallel to the bayonet member and lie in a plane passing through the ribs and the axis of the bayonet member so that the plane is substantially perpendicular to the plane passing through the axes of the cylinder body mounting bores. The ribs in the preferred embodiment extend along substantially the entire length of the side wall of each of the bayonet members. Diametrically opposed ribs are provided, it being understood that in some circumstances only one such rib may be provided and in others more than two ribs may be provided. For example, three ribs may be located on radii extending from the bayonet member axis but not necessarily in precisely the same plane for all such rib radii. It is also within the purview of the invention that other types of protuberances, for example a plurality of nubs, may be provided in place of a rib. It is also recognized that the ribs may be intersected by one or more seal grooves containing seals which operate to seal the bayonet member to the cylinder wall of the mounting bore with which it is associated. Therefore, even though the rib is divided into sections, it is preferred to herein as one rib.

In the preferred embodiment illustrated and described below, at least one of the mounting arrangements including a bayonet member and mounting bore is provided with such radius-increasing means, and preferably both or all such mounting arrangements are so constructed.

More particularly, the invention is incorporated in a master cylinder assembly having a cylinder body and a reservoir body, the cylinder body having first and second reservoir mounting bosses respectively having first and second cylindrically formed reservoir mounting surfaces arranged in axially parallel spaced relation with the axes thereof located in a first plane passing through the cylinder body. The reservoir body has first and second mounting members extending from the bottom of the reservoir in axially parallel spaced relation and respectively mating with the first and second cylinder body reservoir mounting surfaces in mounted sealing relation to deliver brake fluid between the interior of the reservoir body and the interior of the cylinder body. The reservoir body mounting members have basic radii which are established by worst case tolerancing in the first plane. This worst case tolerancing involves the reservoir mounting bosses and the reservoir mounting surfaces and the reservoir mounting members. The improvement to which the invention more specifically relates is that of having at least one of the first reservoir mounting surfaces or at least one of the reservoir mounting members, or at least one of each such, with localized basic radius changing means formed thereon and located in a second plane which passes through the axis of the surface and/or member on which the localized basic radius changing means is formed, the second plane intersecting the first plane. The localized changed radius of the selected surface or surfaces and member or members, when taken through and including the radius changing means thereon, is different from the basic radius of that selected surface or surfaces and member or members. This localized changed radius is preferably established by worst case tolerancing in the second plane. Such worst case tolerancing involves only the first reservoir mounting boss and the first reservoir mounting surface and the first reservoir mounting member.

In another aspect of the invention, the master cylinder assembly in which the invention is incorporated has a cylinder body and a reservoir body, the cylinder body having first and second reservoir mounting bores formed therein in axially parallel spaced relation with the axes thereof located in a first plane passing through the cylinder body. The reservoir body has first and second mounting bayonet members extending therefrom in axially parallel spaced relation and respectively received in the cylinder body mounting bores in mounted sealing relation to deliver brake fluid between the interior of the reservoir body and the interior of the cylinder body. The bayonet members have basic radii established by worst case tolerancing in the first plane. Such worst case tolerancing involves both of the reservoir mounting bores and both of the mounting bayonet members. The improvement to which the invention is specifically directed comprises the first mounting bayonet member having localized basic radius increasing means formed thereon and located in a second plane passing through the axis of the first mounting bayonet member and intersecting the first plane. The radius of the first mounting bayonet member in that second plane, taken through and including the radius increasing means, is greater than the basic radius of the first mounting bayonet member and is preferably established by worst case tolerancing in the second plane. Such worst case tolerancing involves only the first reservoir mounting bore and the first mounting bayonet member.

In another aspect of the invention, it more specifically involves having such localized basic radius increasing means formed on the first and the second mounting bayonet members. The radius in the second plane noted above, taken through each of the radius increasing means, involves worst case tolerancing only for the particular mounting bayonet member and the particular reservoir mounting bore with which that particular radius increasing means is associated.

In a still more particular aspect of the invention, the second plane noted above in any of those types of arrangements is substantially perpendicular to the first plane and consideration is given to the basic diameter and the localized basic diameter increasing means.

In additional particular aspects, the invention relates specifically to a provision of diametrically opposed axially extending ribs which provide the radius or diameter increasing means of any of the above noted arrangements.

In any of the arrangements containing the noted various aspects of the invention, the reservoir body is made more stable in a side-to-side aspect by reducing the side-to-side clearance to better match the radius or diameter of the particular reservoir boss or bore. This makes for a rigid and stronger interface between the reservoir body and the cylinder body.

DESCRIPTION OF THE PREFERRED EMBODIMENTS

Figure 1:
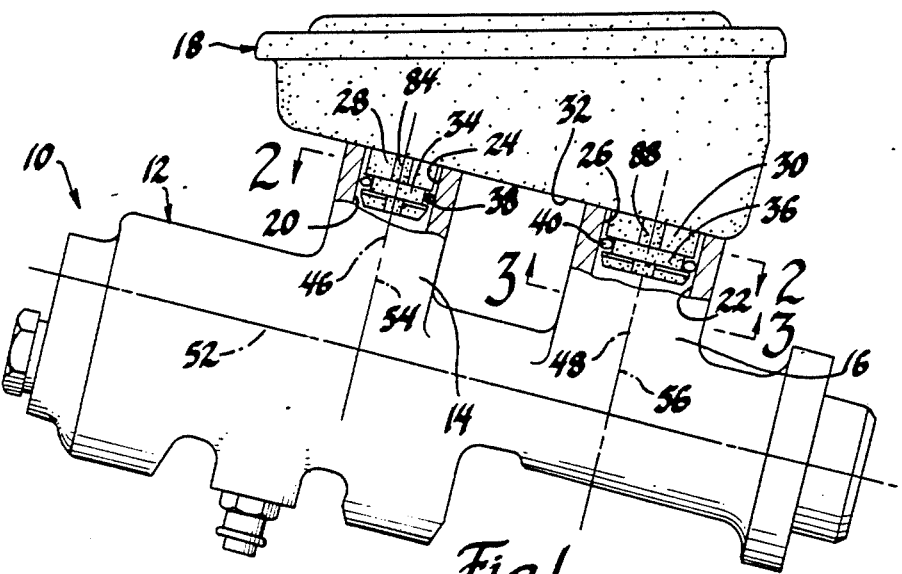
FIG. 1 is an elevation view with parts broken away and in section of a master cylinder assembly embodying the invention.

The master cylinder assembly 10 in FIG. 1 is illustrated as being a dual master cylinder with two pressurizing pistons (not shown) arranged in tandem in a single bore (not shown) formed in the cylinder body 12. Cylinder body 12 is illustrated as having a first boss 14 and a second boss 16 integrally formed therewith and extending upwardly so as to provide a mounting for the reservoir body 18. Bosses 14 and 16 also provide for the delivery of brake fluid between the interior of the reservoir body 18 and the interior of the cylinder body 12, as is well known in the art. Such arrangements are disclosed by way of example in several of the above noted U.S. patents.

It is to be understood that it is only this preferred embodiment that is disclosed, and that the general arrangement of the master cylinder assembly 10 may be modified while still using the claimed invention. For example, in some instances, three or more tandem pressurizing pistons may be provided in the bore of the cylinder body, and a boss for each of the pressurizing chambers associated with those pistons may then be provided. It is also to be understood that the master cylinder assembly 10 may be of the type wherein the cylinder body 12 has two or more parallel bores therein, with the reservoir body 18 extending generally transversely of the body rather than generally longitudinally thereof as illustrated in FIG. 1 so as to be mounted on bosses which provide access to each of the axially parallel cylinder bores. In some instances, bosses extending above the main portion of the cylinder body 12 may not be provided. Instead, the mounting arrangement may simply be recessed in a main part of the cylinder body.

In the preferred embodiment illustrated, each of the bosses 14 and 16 has a cylindrically formed reservoir mounting bore, with mounting bore 20 being provided in boss 14 and mounting bore 22 being provided in boss 16. Boss 14 has a cylindrically formed reservoir mounting surface 24 defined by the inner wall of the mounting bore 20. Similarly, boss 16 has a cylindrically formed reservoir mounting surface 26 formed by the inner wall of the mounting bore 22.

Reservoir 18 has a first mounting member 28 and a second mounting member 30 extending from the bottom 32 of the reservoir body 18. Mounting members 28 and 30 are illustrated as spigots or bayonets extending downwardly from bottom 32 outwardly of the reservoir body. In some instances they may be mounting flanges which extend upwardly or downwardly from the bottom 32. Upwardly extending flanges may extend into the interior of the reservoir body 18, much like the mounting flanges of U.S. Pat. No. 4,004,707, referred to above. However, in the preferred embodiment further described they are hereafter referred to as bayonet members.

Each of the bayonet members 28 and 30 is constructed much like the others. However, the diameters of one bayonet member and its mating cylindrical mounting surface may be different from the respective diameters of the other bayonet member and its mating cylindrical mounting surface. This arrangement prevents incorrect assembly of the reservoir body 18 on the cylinder body 12.

The bayonet members 28 and 30 are respectively provided with grooves 34 and 36 in which seals 38 and 40 are respectively received so that the seals respectively engage the surfaces 24 and 26 in sealing relation, sealing the bayonet members 28 and 30, and therefore reservoir body 18, with respect to the cylinder body 12. Bayonet members 28 and 30 are likewise respectively provided with axially extending passages 42 and 44 which provide fluid communication between the interior of the reservoir body 18 and the lower portions of mounting bores 20 and 22, which in turn provides fluid communication, in a manner well known in the art, to the piston bore or bores in the cylinder body 12. Bayonet member 28 has an axis 46 and bayonet member 30 has a similar axis 48. Axes 46 and 48 are preferably parallel to each other and lie in a common plane 50. Plane 50 passes through not only axes 46 and 48 but also through the cylinder body 12. In the preferred embodiment illustrated, axes 46 and 48 may intersect the axis 52 of the cylinder body 12, which axis may be the axis of the pressurizing chamber bore formed therein, as is well known in the art but is not illustrated for simplicity. Axes 46 and 48 may be coincident with the respective axes 54 and 56 of mounting bores 20 and 22. While this is the most common case, there are some instances in which either or both axes 46 and 48 may be offset from their respectively associated axes 54 and 56. Likewise, in the common case, axes 46, 48, 54, and 56 may intersect axis 52 but this arrangement is not necessary to the practice of the invention.

Figure 2:
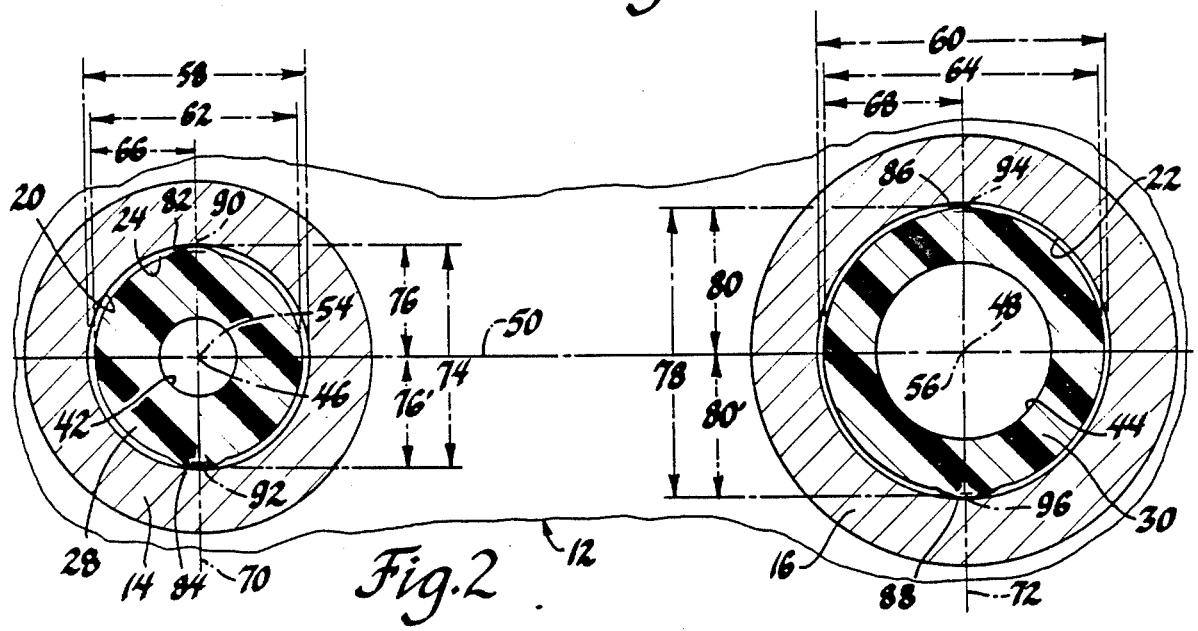
FIG. 2 is a fragmentary cross-section view with parts broken away, taken in the direction of arrows 2—2 of FIG. 1.
Figure 3:
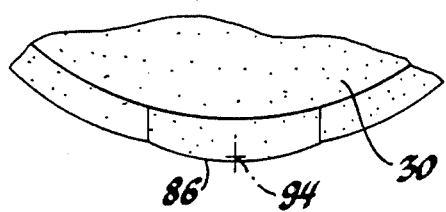
FIG. 3 is a fragmentary elevation view taken in the direction of arrows 3—3 of FIG. 1.

To provide references for further description, and particularly referring to FIG. 2, the diameter 58 of bore 20 is illustrated as being the bore diameter lying in first plane 50 passing through the bore axis 54, and the diameter 60 of bore 22 is illustrated as being that bore diameter lying in plane 50 passing through the bore axis 54. The basic diameter 62 of the bayonet member 28 is similarly illustrated as lying in plane 50 which passes through the axis 46 of bayonet member 28. The basic diameter 64 of the bayonet member 30 is similarly shown as lying in plane 50 which passes through the axis 48 of the bayonet member 30. In each instance in which reference is made to a diameter, it is understood that half of that diameter is the corresponding radius of the same element. Therefore, the basic radius 66 of bayonet member 28 is one-half of the basic diameter 62 and the basic radius 68 of bayonet member 30 is one half the basic diameter 64.

Also for descriptive reference purposes, a second plane 70 passes through the coincident axes 46 and 54 and intersects plane 50, preferably being substantially perpendicular to that plane as illustrated. Similarly, a third plane 72 passes through coincident axes 48 and 56 and intersects plane 50, preferably also being substantially perpendicular to that plane. As will be more specifically referred to below, bayonet member 28 has a localized increased diameter 74 lying in plane 70, and the localized increased radii 76, 76' thereof are each one-half of the diameter 74. Similarly, bayonet member 30 has a localized increased diameter 78 lying in plane 72, half of that diameter being the localized increased radii 80 and 80'.

The differences in diameters 58 and 62, and in diameters 60 and 64, are usually determined by worst case tolerancing involving both mounting bores 20 and 22 as well as both bayonet members 28 and 30. This worst case tolerancing is taken in plane 50 and must consider, by way of example, the allowable tolerance of the distance between axes 46 and 48, the distance between axes 54 and 56, the diameters 58 and 60, and the diameters 62 and 64. While the actual differences in the diameters may not be as great as illustrated in the drawing for clear illustrative purposes, those diameter differences are sufficient to permit substantial side-to-side movements of the reservoir body 18. The invention is directed to the elimination, or at least the substantial minimizing, of the side-to-side movements of the reservoir body 18 after the master cylinder assembly is installed in a working device such as an automotive vehicle, without requiring additional fasteners.

In the preferred embodiment illustrated in the drawing, the basic diameter 62 of the bayonet member 28 is locally increased in plane 70 by providing protuberances on the outer surface of the bayonet member, these protuberances being formed as ribs 82 and 84. Similar ribs 86 and 88 are provided on bayonet member 30. These ribs provide localized increased radii 76, 76' and 80, 80′, respectively. In terms of diameters they respectively provide localized increased diameters 74 and 78. The ribs 82, 84, 86 and 88 may be considered to respectively have axes 90, 92, 94 and 96 extending longitudinally therethrough respectively parallel to the axes 46 and 48 of bayonet members 28 and 30. In the preferred embodiment, plane 70 therefore passes through axes 46, 90 and 92 and plane 72 passes through axes 48, 94 and 96. It is to be understood that the localized increased radius 76 of rib 82, for example, may be somewhat offset from plane 70 if needed, so that it lies in a different plane intersecting only axis 46 and axis 90. It may be in some instances that two such ribs 82 must be provided on either side of plane 70 so that their respective radii are angularly displaced from that plane. However, this displacement must not be so great that the worst case tolerance for the entire assembly as noted above has to be considered in determining the increased size of the appropriate localized increased radius 76 in relation to the basic radius 66. Similarly, rib 84 may be similarly offset either diametrically opposite the offset rib 82 or on the same side of plane 70 as rib 82 may be offset. In some instances it may be desirable to provide more than one rib on one side of bayonet member 28, or occasionally even on both sides. This may be done within the scope of the invention so long as the localized increased radii remain established by worst case tolerancing involving only the one respective mounting member and mounting surface. The same considerations and modifications may apply to the bayonet member 30.

Ribs 82, 84, 86 and 88 are shown extending through substantially the entire longitudinal length of the bayonet members 28 and 30 which are received in the mounting bores 20 and 22. In so extending, they are intersected by the seal grooves 34 and 36 and therefore divided into upper and lower sections. For convenience, however, this is considered to be a single rib in each instance. It is to be understood that other types of protuberances may be provided which do not extend through the entire longitudinal length of the bayonet members. For example, instead of a rib, two or more bumps may be provided which accomplish the same effect. Ribs are preferred since it is much easier to mold them as part of the reservoir body 18 than it would be to provide longitudinally spaced bumps or mounds.

If the bayonet members 28 and 30 and the bosses 14 and 16 are constructed in a reverse manner so that the portion formed as a part of the reservoir body 18 fits around the bosses instead of inside the bosses, it would be within the scope of the invention to provide the ribs or equivalent on the interior of the projections from the reservoir body or on the outside of the bosses providing appropriate mounting surfaces. Other arrangements which remain in the scope of the invention may also be used and different arrangements for changing the appropriate radius or diameter in the appropriate localized areas may be used, so long as the construction minimizes the side-to-side clearance between the reservoir body mounting members and the cylinder body mounting members is defined by the worst case tolerancing only between the two associated mounting members, and not all of the mounting members as well as other distances set by the cylinder body construction, all reducing side-to-side movements of the reservoir body on the cylinder body. Employment of the disclosed and claimed invention will eliminate the need for providing flanges and screws to tightly secure the reservoir body in position as is taught in the above noted U.S. Pat. No. 4,213,535, for example, while still providing a strong and rigid interface between the reservoir body and the cylinder body.

I claim:

1. In a master cylinder assembly having a cylinder body and a reservoir body, said cylinder body having first and second reservoir mounting bosses respectively having first and second cylindrically formed reservoir mounting surfaces arranged in axially parallel spaced relation with the axes thereof located in a first plane passing through said cylinder body, and said reservoir body having first and second mounting members extending from the bottom thereof in axially parallel spaced relation and respectively mating with said first and second cylinder body reservoir mounting surfaces in mounted sealing relation to deliver brake fluid between the interior of said reservoir body and the interior of said cylinder body, said reservoir body mounting members having basic radii established by worst case tolerancing in said first plane involving said reservoir mounting bosses and said reservoir mounting surfaces and said reservoir mounting members, the improvement comprising:

at least a selected one of said first reservoir mounting surfaces and reservoir mounting members having localized basic radius changing means formed thereon and located in a second plane passing through the axis of that selected at least one and intersecting said first plane, the localized changed radius of said selected at least one in said second plane taken through and including said radius changing means being different from the basic radius of said selected at least one and being established by worst case tolerancing in said second plane involving only said first reservoir mounting member and said first reservoir mounting boss including said first reservoir mounting surface.

2. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said bayonet members having basic radii established by worst case tolerancing in said first plane involving both of said reservoir mounting bores and both of said mounting bayonet members, the improvement comprising:

said first mounting bayonet member having localized basic radius increasing means formed thereon and located in a second plane passing through the axis of said first mounting bayonet member and intersecting said first plane, the radius of said first mounting bayonet member in said second plane through and including said radius increasing means being greater than the basic radius of said first mounting bayonet member and being established by worst case tolerancing in said second plane involving only said first reservoir mounting bore and said first mounting bayonet member.

3. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said mounting bayonet members having basic radii established by worst case tolerancing in said first plane involving both of said reservoir in mounting bores and both of said mounting bayonet members, the improvement comprising:

said first and second mounting bayonet members each having localized basic radius increasing means formed thereon respectively located in second and third planes respectively passing through the axes of said first and second mounting bayonet members and intersecting said first plane, the radius of said first mounting bayonet member in said second plane through and including said radius increasing means on said first mounting bayonet member being greater than the basic radius of said first mounting bayonet member and being established by worst case tolerancing in said second plane involving only said first reservoir mounting bore and said first mounting bayonet member, and the radius of said second mounting bayonet member in said third plane through and including said radius increasing means on said second mounting bayonet member being greater than the basic radius of said second mounting bayonet member and being established by worst case tolerancing in said third plane involving only said second reservoir mounting bore and said second mounting bayonet member.

4. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said bayonet members having basic diameters established by worst case tolerancing in said first plane involving both of said reservoir mounting bores and both of said mounting bayonet members, the improvement comprising:

said first mounting bayonet member having localized basic diameter increasing means formed thereon and located in a second plane passing through the axis of said first mounting bayonet member and substantially perpendicular to said first plane, the diameter of said first mounting bayonet member in said second plane through and including said diameter increasing means being greater than the basic diameter of said first mounting bayonet member and being established by worst case tolerancing in said second plane involving only said first reservoir mounting bore and said first mounting bayonet member.

5. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said mounting bayonet members having basic diameters established by worst case tolerancing in said first plane involving both of said reservoir mounting bores and both of said mounting bayonet members, the improvement comprising:

said first and second mounting bayonet members each having localized basic diameter increasing means formed thereon respectively located in second and third planes respectively passing through the axes of said first and second mounting bayonet members and substantially perpendicular to said first plane, the diameter of said first mounting bayonet member in said second plane through and including said diameter increasing means on said first mounting bayonet member being greater than the basic diameter of said first mounting bayonet member and being established by worst case tolerancing in said second plane involving only said first reservoir mounting bore and said first mounting bayonet member, and the diameter of said second mounting bayonet member in said third plane through and including said diameter increasing means on said second mounting bayonet member being greater than the basic diameter of said second mounting bayonet member and being established by worst case tolerancing in said third plane involving only said second reservoir mounting bore and said second mounting bayonet member.

6. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said bayonet members having basic diameters established by worst case tolerancing in said first plane involving both of said reservoir mounting bores and said mounting bayonet members, the improvement comprising:

said first mounting bayonet member having a pair of diametrically opposed axially extending ribs formed thereon with rib axes parallel to the axis of said first mounting bayonet member and located in a second plane passing through the axis of said first mounting bayonet member and substantially perpendicular to said first plane, the diameter of said first mounting bayonet member in said second plane through and including said ribs being greater than the basic diameter of said first mounting bayonet member and being established by worst case tolerancing in said second plane involving only said first reservoir mounting bore and said first mounting bayonet member.

7. In a master cylinder assembly having a cylinder body and a reservoir body, said cylinder body having first and second reservoir mounting bores formed therein in axially parallel spaced relation with the axes thereof located in a first plane passing through said cylinder body, and said reservoir body having first and second mounting bayonet members extending therefrom in axially parallel spaced relation and respectively received in said cylinder body mounting bores in mounted sealing relation to deliver brake fluid between the interior of said reservoir body and the interior of said cylinder body, said bayonet members having basic diameters established by worst case tolerancing in said first plane involving both of said reservoir mounting bores and said mounting bayonet members, the improvement comprising:

said first and second mounting bayonet members each having a pair of diametrically opposed axially extending ribs formed thereon with rib axes respectively parallel to the axes of said first and second mounting bayonet members and respectively located in second and third planes respectively passing through the axes of said first and second mounting bayonet members and substantially perpendicular to said first plane, the diameter of said first mounting bayonet member in said second plane through and including said ribs on said first mounting bayonet member being greater than the basic diameter of said first mounting bayonet member and being established by worst case tolerancing in said second plane involving only said first reservoir mounting bore and said first mounting bayonet member, and the diameter of said second mounting bayonet member in said third plane through and including said ribs on said second mounting bayonet member being greater than the basic diameter of said second mounting bayonet member and being established by worst case tolerancing in said third plane involving only said second reservoir mounting bore and said second mounting bayonet member.

* * * * *